United States Patent [19]

Chupka et al.

[11] Patent Number: 4,795,560

[45] Date of Patent: Jan. 3, 1989

[54] SCREEN PLATES

[75] Inventors: David E. Chupka, Middletown, Ohio; Carl C. Landegger, New York, N.Y.

[73] Assignee: The Black Clawson Company, Middletown, Ohio

[21] Appl. No.: 81,771

[22] Filed: Aug. 5, 1987

Related U.S. Application Data

[63] Continuation-in-part of Ser. No. 039,391, Apr. 16, 1987, abandoned.

[51] Int. Cl.⁴ .............................................. B01D 39/10
[52] U.S. Cl. ................ 210/497.01; 29/163.8; 162/251; 209/270; 209/273; 209/306; 209/397; 210/498; 210/415; 219/121.67
[58] Field of Search ................... 162/55, 251; 420/588; 29/163.5 CW, 163.5 F; 219/121 LG, 121 LH, 121 LJ; 210/157, 161, 162, 166, 380.1, 402, 403, 497.01, 498, 499, 415, 413; 209/288, 300, 305, 273, 306, 392, 397, 270, 303

[56] References Cited

U.S. PATENT DOCUMENTS

| 2,835,173 | 5/1958 | Martindale | 209/270 |
|---|---|---|---|
| 3,327,853 | 6/1967 | Bixby | 210/499 |
| 3,561,603 | 2/1971 | Salomon | 210/497.01 X |
| 3,617,008 | 11/1971 | Lamort | 209/393 |
| 3,713,541 | 1/1973 | Nelson | 210/415 |
| 3,941,703 | 3/1976 | Binard | 210/499 |
| 4,155,841 | 5/1979 | Chupka et al. | 210/415 |
| 4,309,284 | 1/1982 | Morimoto et al. | 209/273 |
| 4,317,023 | 2/1982 | Gryskiewicz | 29/163.5 CW |
| 4,430,297 | 2/1984 | Crook | 420/587 |
| 4,487,695 | 12/1984 | Connolly | 210/499 |

FOREIGN PATENT DOCUMENTS 2933242 10/1968 United Kingdom ............ 210/380.1

OTHER PUBLICATIONS

"Quality in Laser-Gas-Cutting Stainless Steel and Its Improvement", Welding Research Institute, Osaka University, Suita, Osaka, Japan, vol. 10, No. 2, Dec. 2, 1981 of Arata et al.
"Reinventing the Lathe" *Manufacturing Engineering*, Jun. 1986, Gregory T. Farnum.
"Microstructure and Its Effect on Toughness and Wear Resistance of Laser Surface Melted and Post Heated High Speed Steel", *Metallurgical Transactions* vol. 15A, 10/84 pp. 1829–1835 Leif Ahman.

*Primary Examiner*—Richard V. Fisher
*Assistant Examiner*—W. Gary Jones
*Attorney, Agent, or Firm*—Biebel, French & Nauman

[57] ABSTRACT

A screen plate and plate and method of making a screen plate for the pressure screening of papermaking stock in pressure screening apparatus includes slots which have been cut therethrough by a machining laser beam focused at the inlet side of the plate, to provide slots with nearly straight walls with minimum taper, and which are recast and have a "glassy" appearance by reason of the melting and resolidification of the immediate wall surface, to provide a low friction path for the stock. Straight, curved and inclined or slanted slots are disclosed including slots which are at a diagonal to the axis of the cylinder. Slots or openings are disclosed which are inclined to a radius line therethrough both with and against the direction of flow of the stock along the inlet surface. Wear bars are applied to the plate for coaction with the rotating foils on the screening apparatus, in the form of strips of weld material of high hardness applied directly to the plate.

16 Claims, 3 Drawing Sheets

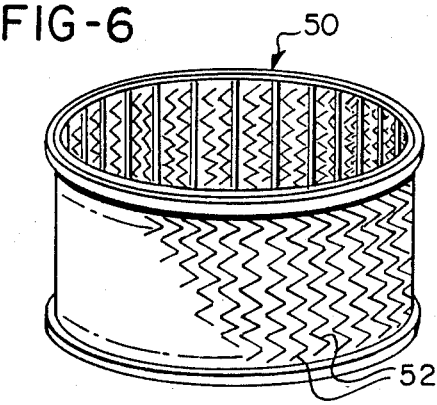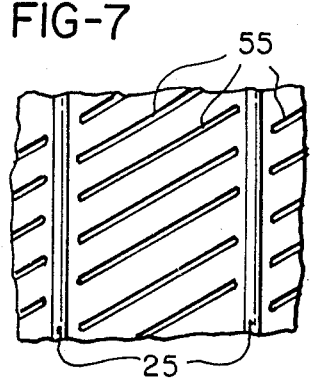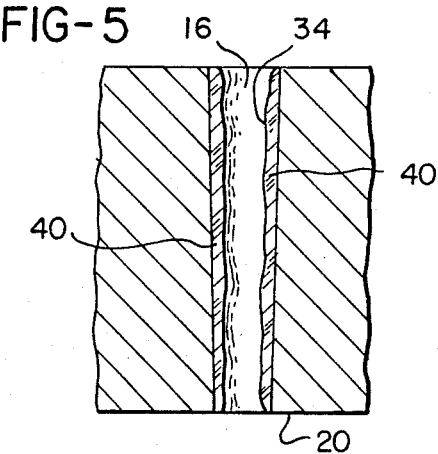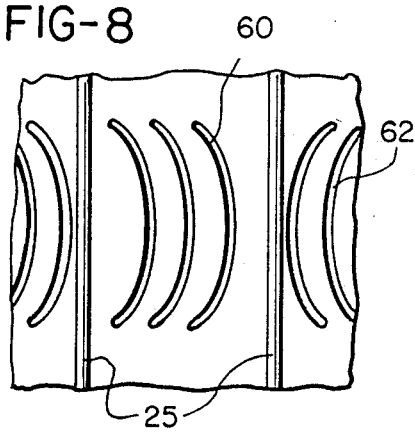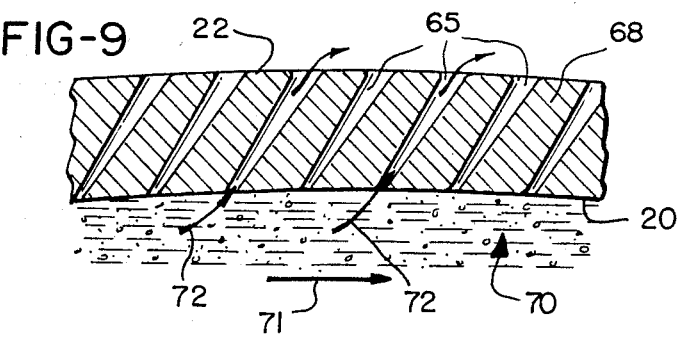

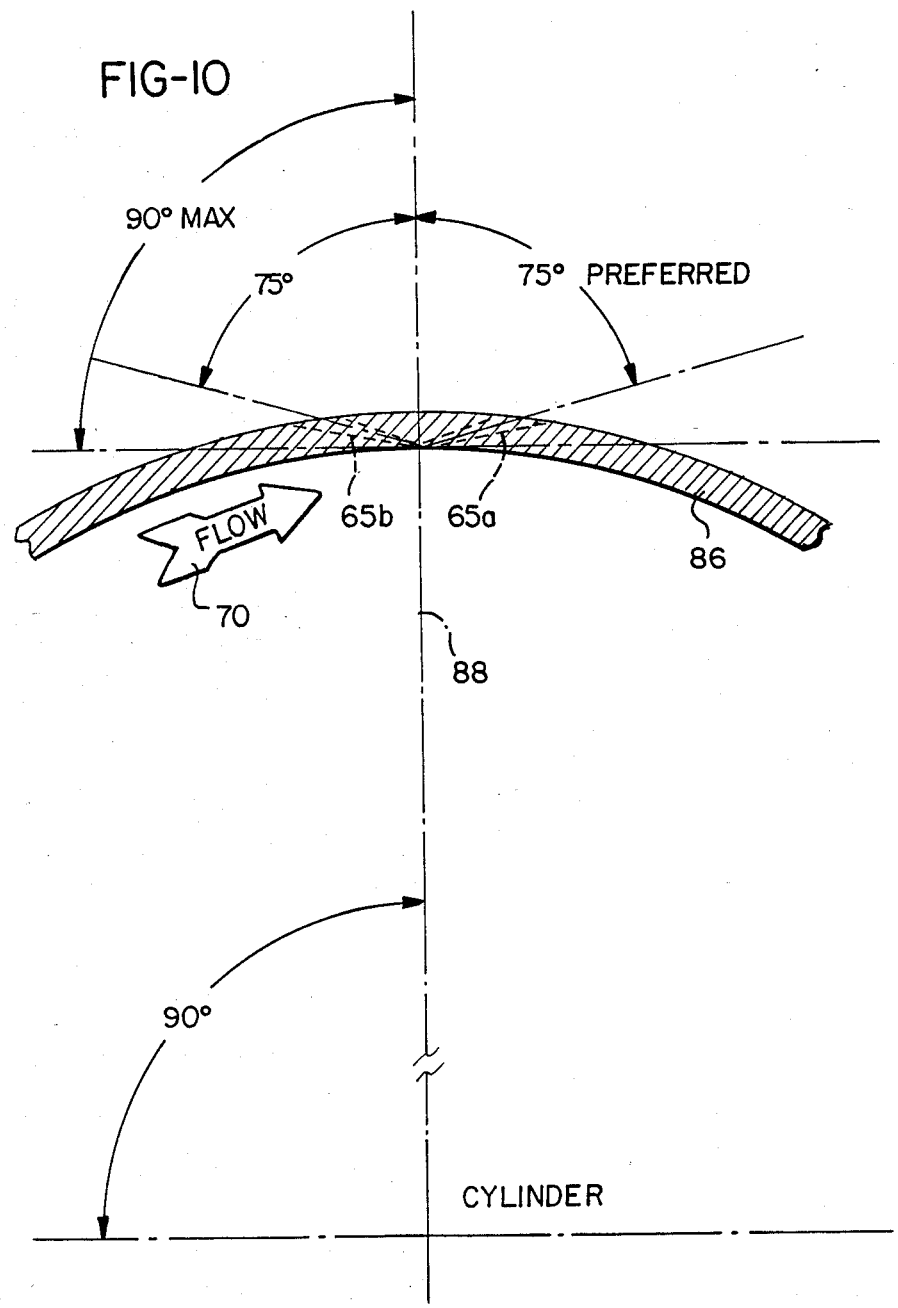

SCREEN PLATES

RELATED APPLICATION

This application is a continuation-in-part of copending application Ser. No. 039,391 filed Apr. 16, 1987 of Chupka, now abandoned.

BACKGROUND OF THE INVENTION

This invention relates to screen plates and more particularly to plate-type screens which are used in pressure screening apparatus for removing contaminant particles from papermakers' stock.

High turbulence pressure screening apparatus of the kind shown, for example, in U.S. Pat. No. 4,155,841 issued May 22, 1979 to Chupka and Seifert, and assigned to the same assignee as this invention, is used in the preparation of papermaking stock. A suspension of liquid and paper fibers, which may in varying degrees contain undesirable rejects or contaminate particles, is supplied to the inlet of the apparatus as disclosed, for example, in the U.S. Pat. No. 4,155,841, where it is applied to an annular cylindrical shaped screen having specifically designed slots or perforations threrethrough. Typically, the paper stock is fed to the interior of a vertically oriented cylindrical screen, and the rejects are withdrawn from one end of such a screen, while the accepts pass through the slots or perforations in the screen and are collected at a location outwardly of the screen. Additionally, rotating foils or vanes are positioned either inside or outside the screen surface, in closely adjacent relation to the screen surface, to reduce the plugging of the screen slots or holes.

Such screens, as used in the separating apparatus, may further be provided with a plurality of generally axially-extending, radially spaced bars on the inlet surface of the screen which, in U.S. Pat. No. 4,155,841, is the radially inner surface of the screen. The bars cooperate with the rotating foils to reduce flow movement parallel to the surface of the screen and cause regions of turbulence in the stock adjacent the inlet side of the screen cylinder, to improve screening as disclosed for example in U.S. Pat. No. 4,410,424 issued Oct. 18, 1983 to Chupka and Seifert and assigned to the same assignee as this application.

In the design of such screen plates, it is desirable that the slots or holes present a sufficient percentage of open area as to provide adequate capacity. However, increasing the number of slots to increase the percent of open area, with conventionally formed slots, results in a substantial loss of metal of the plate and a corresponding decrease in the plate's strength. This is due to the fact that conventional metal cutting practices result in the formation of substantial relief areas on either side of the slot, often dependent upon the thickness of the plate itself. Commonly, such plates range between 0.25" and 0.50" thick, with 0.31" thickness being typical, with a size approximately 9" high and 24" in diameter being typical, although screen sizes may be as large as 60" high and 60" in diameter. Accordingly, the limitations of the machining or cutting step often define the extent of openness or percent of open area which can practically be achieved in a given plate.

In the manufacture of such screen plates, the turbulence-inducing bars have commonly been separately formed and welded in the desired position. In order to prevent warpage, this has commonly resulted in the use of bars of reasonably heavy stock, such as 0.25" stock material, although smaller bars would normally be preferred to permit the foils to pass closer to the slots than is possible when using thicker or larger bars. The bars, when applied to a slotted plate, also tend to warp the slots and may have the effect of rendering the slot size so variable that the cylinder must be scrapped. Further, the act of welding on the land areas induces and causes weaknesses in the cylinders.

In conventional screen plates as described above, the material of the plate and material of the bar is subject to wear by friction and erosion over time. Such wear results in a loss of distinctiveness of the individual orifices or slots by reason of the rounding off of the lines of demarcation or edges between the inner or inlet surface of the plate and the orifices, as well as the edges of the bars, the result in an undesirable effective increase in orifice diameters or slot widths. There is accordingly a need for a manufacturing technique and process for making screen plates in which substantially harder materials may be economically used to extend the effective life of the plate, and to increase the percentage of open area without sacrificing strength.

There further exists a need to recondition or rebuild an existing screen plate or cylinder, either where it was not originally made with wear bars and to rebuild original wear bars which have become worn.

Conventional screen plates are further characterized by openings, such as slots or holes, which are normal to the surface, that is, the openings or slots extend in the direction of the shortest distance between the inlet and outlet surfaces. Further, in the case of slots, such slots are commonly either circumferential or axial to the cylinder, and are not arranged in distinctive or unique patterns.

SUMMARY OF THE INVENTION

This invention relates more particularly to a screen plate or screening cylinder for use in screening apparatus for paper stock. One aspect of the invention relates to a method of making the same, in which a plurality of individual openings, such as holes or slots, are formed in a plate by laser cutting or machining.

It has been found that the laser metal cutting techniques as applied to a screen plate as disclosed and described herein, result in the manufacture of a plate having new and unobvious properties, make possible a higher percent of open area, enable a greater percent of metal to remain in the plate for strengthening the plate, provide openings or slots which have a minimum of relief, promote the use of substantially harder metals or materials, and provide openings which are true and substantially square at the respective surface interfaces.

Another and unexpected advantage of the invention is that the use of laser cutting of the screen plate stock results in the formation of openings walls which are very smooth or "glassy" in appearance by reason of the fact that the immediate material of the wall has been momentarily melted and recast followed by rapid cooling. Although the walls themselves may undulate slightly, as compared to a tool-cut wall, such surface undulations do not detract from the effectiveness of the screen plate. In fact, the molten and recast surfaces which are presented to the stock at the walls materially aid in the reduction of friction and the flow of stock through the plate.

The method of this invention permits the formation of complex hole or slot designs, such as curved, inclined chevron or zig-zag patterns, as may be desired to enhance the performance of the screen plate or provide a distinctive slot pattern. A particularly advantageous result is that the openings may be conveniently inclined relatively either with or against to the direction of flow of the stock within the cylinder. The inclination of an opening or slot in alignment with or parallel to the direction of flow has the effect of enhancing the flow of stock through the slots or openings by reducing to a substantial extent the angle through which the rotating or swirling stock must turn.

It is also within the scope of then invention to incline the openings or slots in a direction contrary or acute to the flow vector of the stock thereby causing the longer rejects to have to turn through a greater angle to enter the opening. The inclination of the slots or openings contrary to, or forming an acute angle with, the flow vector of the stock within the screen serves to reject heavier particles such as cubicle particles, bits of sand, bark, dirt, and also to reject longer pieces of fiber, plastics and other debris, thereby providing a higher degree of cleanliness downstream of the screen and a correspondingly higher percentage of rejects upstream of the screen. Further, it is within the scope of the invention to provide a compound screen in which the screen is characterized by openings or slots which extend in varying angles through the plate, and which at the same time are formed in one or more distinctive patterns, groupings, or configurations.

Further, the method and process of this invention includes the formation of the transverse bars on the inlet surface, sometimes called wear bars, by the application of extremely hard weld material directly to the adjacent surface of the plate and to each other, to a desired thickness. The hard material is applied by welding one or more layers of such material, one on top of each other directly to the screen plate, at the inlet surface thereof for coaction with the rotating foils.

A screen plate product and process are thus achieved in which individual, closely spaced openings, such as slots, are formed extending from an inlet surface to an outlet surface, which openings are substantially free of relief and have a minimum of taper, and provide inlet gaps or openings at a desired width with true and sharp edges at the intersections of the openings with the inlet and outlet surfaces. The minimum relief which is achieved preserves a substantial amount of material in the plate which would otherwise be removed by conventional drilling, routing or slot cutting techniques, and provides a plate which has greater strength than corresponding plates having the same percent of open area and, alternatively, promote the design of thinner plates than previously possible.

Additionally, since the technique of laser cutting is relatively insensitive to the hardness of the material being cut, materials such as extreme hardness steel alloys can be used for the plates and economically machined to reduce the rate of wear, and thereby extend the effective life of the plates.

Similarly, the wear bars themselves may be formed of highly wear resistant or hard materials, such as "Stellite," by the weldment of such material directly to the inlet surface of the plate.

The wear bars may be applied by welding, in the reconditioning of existing screening cylinders or screen plates, to restore the same, or to enhance the operation of such plates where the plate had not been provided with wear bars in the first instance.

Accordingly, a principal object of this invention is the provision of the method of making a screen plate, and the screen plate product, in which a plurality of openings or slots are cut by laser machining to provide passage with a minimum of taper and a plate with a maximum of open area for the amount of metal removed.

Another object of the invention is the provision of a screen plate and method of making a plate in which the wear or interrupter bars are applied as beads of weld material.

A further object of the invention is the provision of a screen plate for paper stock and a method of making the same, that provides for the use of plate material which is substantially harder than can be used with conventional methods of machining the slots or openings therethrough, and which is therefore less subject to wear over long periods of use with abrasive stock materials.

A further object of the invention is the provision of a screen plate, and method of making the same, in which the screen plate openings or slots are inclined to either the axis of the plate, or radius or both.

A further important object of the invention is the provision of a screen plate, and method of making the same, in which openings or slots are formed in irregular or regular curved, zig-zag or wavy patterns, or combinations of the same, and also in which the defined openings extend through the plate at an angle or angles other than normal to the plate surface.

A particular object and advantage of this invention is the provision of a screen plate in which the walls of the openings therethrough are free of conventional tool or machine marks, and are characterized by a wall surface which has been momentarily molten and recast by rapid chilling to provide a "glassy" like appearance, and an extremely hard and friction free surface for the passage of stock therethrough, for enhancing the efficiency of the screen plate.

A still further object of the invention is the provision of a method of reconditioning cylinder screen plates by the application of wear bars to land surfaces between the openings, by the direct application of weld material to the plate surface.

These and other objects and advantages of the invention will be apparent from the following description, the accompanying drawings, and the appended claims.

BRIEF DESCRIPTION OF THE DRAWINGS

FIG. 5 is an enlarged sectional view of one of the slots;

FIG. 6 is a view, similar to FIG. 1, of another embodiment of the invention;

FIG. 7 is an enlarged inside elevational view showing a different slot arrangement;

FIG. 8 is a view similar to FIG. 7 showing a still different arrangement of slots;

FIG. 9 is an enlarged section through a fragment of the plate wall showing the formation of inclined holes or slots, sloping generally in alignment to the direction of movement of the stock; and FIG. 10 is a diagram of a section of a plate, similar to FIG. 9, and illustrating the range of slot inclination in either direction from a radius line.

DETAILED DESCRIPTION OF PREFERRED EMBODIMENT

Figure 1:
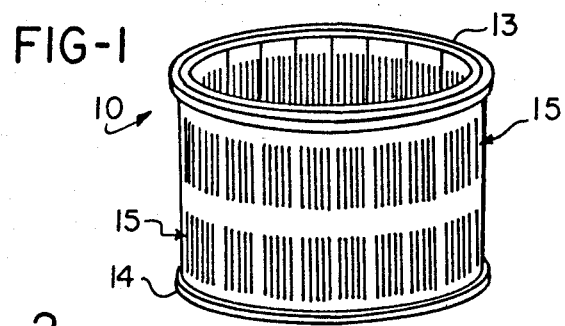
FIG. 1 is a perspective view of a first preferred embodiment of a screen plate made according to this invention for use in paper stock screening apparatus.

Referring to the drawings, which illustrate preferred embodiments of the invention, a vertically cylindrical screen plate is illustrated generally at 10 in FIG. 1. The screen plate as illustrated is designed for use, for example, as the operating screen plate in high turbulence paper stock screening apparatus of the general type shown in Seifert, U.S. Pat. No. 3,849,302 issued Nov. 9, 1974, and the above-referred to U.S. Pat. No. 4,155,841 of Chupka and Seifert as identified by the reference numeral 20 in the latter patent.

Figure 2:
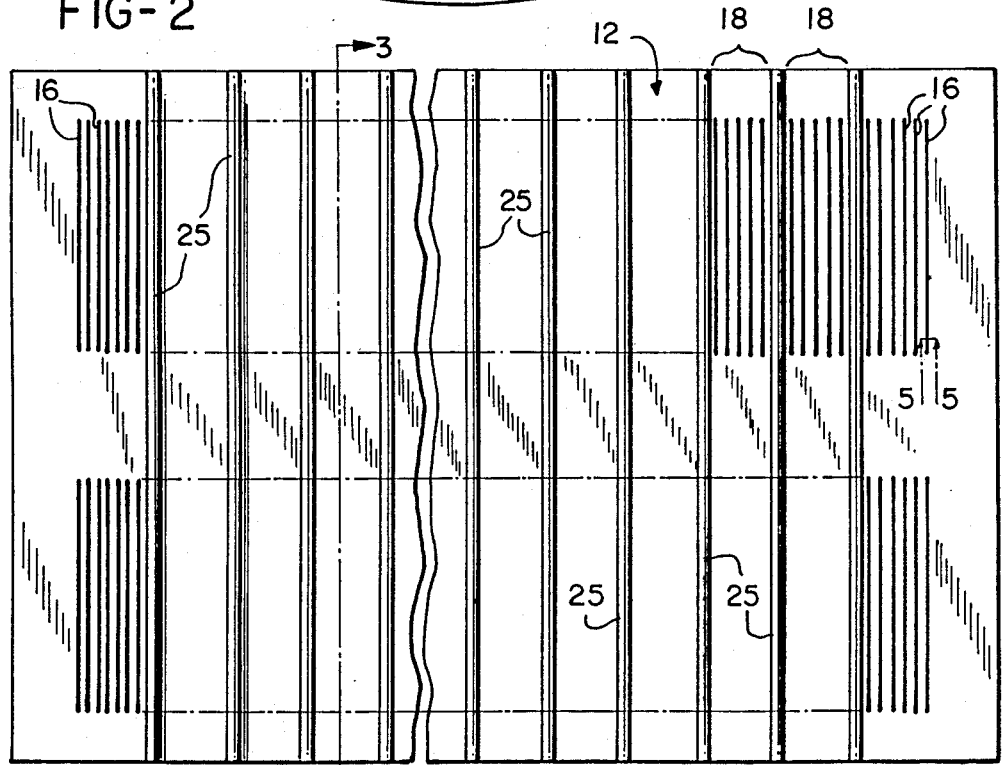
FIG. 2 is a flat developed view, partially broken away, of the plate of FIG. 1.
Figure 3:
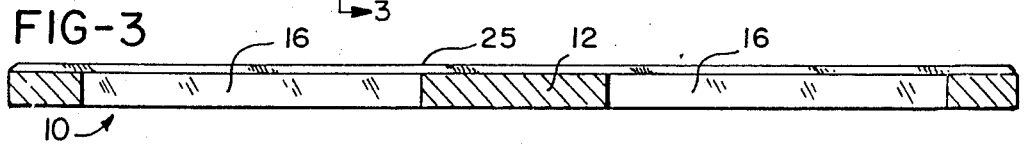
FIG. 3 is an enlarged sectional view thereof taken generally along the line 3—3 of FIG. 2.

The screen plate 10 of this invention includes a body 12 formed of sheet material which is cut flat and subsequently rolled into a cylinder, as shown in FIG. 1. Thereafter, end rings 13, 14 are welded in place for supporting the screen within the screening apparatus as disclosed and described in the above-identified patents. The plate 10 is shown in FIGS. 1 and 2 as having two circumferential rows 15 of generally vertically oriented, angularly spaced slots 16. The slots 16 in each of the rows 15 are formed into individual slot groups 18 with a land area 19 therebetween. The individual slots 16 extend through the body 12 of the plate 10 from an inlet surface 20 to an outlet surface 22, in generally normal relation to the inlet and outlet surfaces.

The intermediate land areas 19 between the groups 18 of slots provide a space for the wear bars or ribs 25 on the inlet surface 20. The bars 25 run the full height of the plate 10 in parallel, radially spaced relation, one for each land area 19, and thus run through both of the rows 15 of slots 16. While parallel, axially-extending wear bars 25 are shown, it will be understood that the technique of applying wear bars by the application of weld material directly to the inlet surface of a screen plate, permits wear bars to be applied in curved regular or irregular patterns on the plate surface. Further, the technique and process of applying wear bars as herein described is useful in the repair and rebuilding or reconditioning of existing screen plates in which the conventional wear bars have been worn, by the replacement of such conventional wear bars by wear bars made in accordance with the teaching of this invention.

The process of this invention, in the application of weld material to the land surface between holes or slots in the reconditioning of existing plates, permits the enhancement of the efficiency of screen plates which originally had not been provided with such bars.

In the manufacture of the screen plate 10, the wear bars 25 are preferably applied to the inside surface 20 before the slots are cut, and before the body 12 of the plate 10 is rolled into a cylinder. The wear bars 25 are uniquely different from bars heretofore employed and consist of weld beads applied directly to the surface 19 such as by a TIG welder, and may consist of an extremely hard cobalt-chromium-tungsten alloy sold by Union Carbide and Chemical Corporation under the trade name "Stellite", applied in three or four passes. Typically, the composite bars 25 may be ⅛" wide and ⅛" high. Wear bars formed exclusively of very hard weld materials, and are formed as a single bead or as a plurality of beads applied on top of each other to the desired thickness. The bars 25 may be substantially lower in profile than heretofore possible since discrete bars of the prior art required sufficient thickness to resist warpage of bars during the welding process. Preferably, the wear bars 25 are applied to the land regions 19 while the body 12 is flat, that is, prior to rolling to form the cylinder, although they may be applied after rolling.

The individual slots 16 are formed by laser energy beam cutting, preferably through the outlet surface 22 toward and into the inlet surface 20, and after the body 12 is rolled into a cylinder. By cutting the slots after rolling, the expansion or widening of the slots which would otherwise accompany the rolling process, is avoided. However, it is within the scope of this invention to cut the openings or slots in the flat stock, prior to rolling.

While a $CO_2$ laser may be used, it is preferred to use a pulsed YAG laser, in which the beam is focused through the outlet surface 22 and at a region adjacent and immediately inwardly of, the inlet surface 20, with respect to the depth or thickness of the body 12. In this manner, since the beam enters the plate from the outlet side and exits the plate at the inlet side, and since the beam itself is focused at the inlet side, the opening formed by the beam at the region of breakthrough at the inlet side is narrower than the opening formed at the outlet side, with the extent of relief or taper being defined essentially by the convergence of the beam, with the result that the wall of the opening has a minimum of taper.

The plate itself may be made of hard stainless steel, such as Armco Steel Corporation's "Nitronic 33" stainless steel, a low-nickel austenitic stainless steel having high resistance to wear and galling, with a Rockwell B hardness of around 95, or "Incon1" or other suitable materials. An advantage of this invention is that very hard otherwise difficult-to-machine materials may be used as the body 12 of the screen plate 10.

The method of this invention has the advantage of permitting the formation of slots over a substantially wide range of slot widths, such as 0.002" or less up to 0.035" or more.

Figure 4:
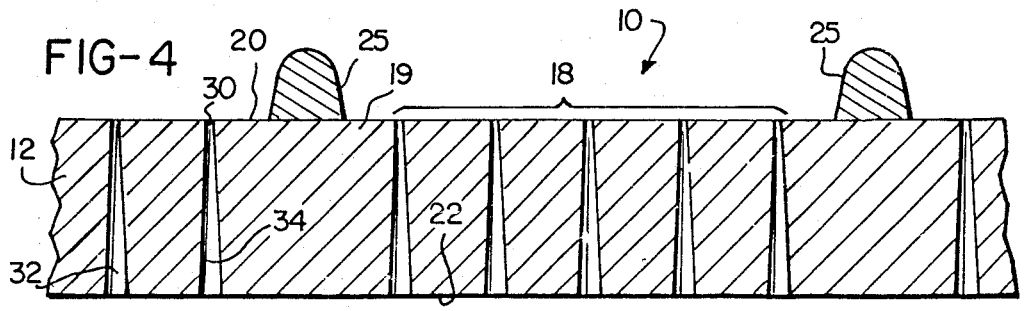
FIG. 4 is an enlarged fragmentary transverse section through one of the screen or slot rows taken generally along the line 4—4 of FIG. 3.

In a preferred embodiment, the slots 16 are formed by laser cutting from the outside or outlet surface 22 to the inlet surface 20. The critical dimension is that of the inlet opening or gap 30 of the individual slot 16, as shown in FIG. 4, which may, for example, be in the order of 0.010". Laser cutting of the slots provides a slot, in a 0.31" thickness plate, with an exit opening 32 in the order of 0.025", defined by generally straight walls 34, thus retaining substantially more metal between adjacent slots than could be retained using conventional machining or slot-cutting apparatus. In this example, the total divergence of the walls is only in the order of 2.5°. It is understood that the invention is not limited to this specific example, and where desired, the inlet opening 30 may be smaller or larger than 0.010", and the exit opening 32 may be as wide as 0.040" or more. In the embodiment shown, the slots 16 are transversely spaced at a density of 6 to the inch, although it is obvious that a greater or few number of slots, either narrower or wider in transverse dimension may be formed, as desired.

In the cutting of the slot 16, as the laser beam burns through the plate, the plate and beam are moved with respect to each other in an axial direction, with reference to the axis of the cylinder, to form a slot in which the narrow end 30 of the slot opens at the inlet surface, and the wider end 32 of the slot opens at the outlet surface, as shown in FIG. 5.

The method of this invention further has the advantage of permitting the accurate formation of holes or slots in the screen plate of widely varying width. For example, widths may be as narrow as 0.002" up to 0.35" r more, as desired for a particular screen. The technique of this invention also enables the stocking of cylinders without openings or slots, so that the particular openings may be cut to the requirements of a customer, thereby reducing the necessity for stocking screen plates or cylinders of predetermined slot or opening sizes, patterns, etc.

As previously mentioned, the walls 34 of the opening are free of tool or machine marks. Thus, the invention has particular utility in the manufacture of a screen plate in that the openings through the plate are characterized by walls which have an extremely smooth and hard surface, thereby enhancing the efficiency of the plate, whether the openings are in the form of holes or slots. This is due to the fact that, during the cutting steps, the surfaces of the walls which define the openings or slots are heated by the laser beam to the point where a very thin exposed layer 40 (shown with exaggerated thickness in FIG. 5) of the walls is momentarily heated to a molten state. As the laser beam passes, the wall layer 40 rapidly cools due to the mass of material and the thinness of the layer which has been molten. The resulting coalecence forms a "glassy" or recast outer or exposed surface 34 to the walls, which may undulate slightly, and which is very hard and totally free of tool marks. Thus, it has been found that these walls present a minimum of friction to the flow of stock therethrough with the result that the screen plate exhibits greater capacity as compared to plates in which the openings are conventionally cut or machined.

In view of the fact that the holes, openings or slots are formed by laser cutting, it will be appreciated that it is not necessary that the holes or slots be formed in truly normal relation to either the inside or outside surfaces of the plate, nor is it necessary that the slot be aligned either axially or circumferentially or that the slots run in straight lines. In fact, the technique and method of this invention permits the formation, in a screen plate, of one or more designs or patterns of slots to provide a unique and characteristic appearance to the plate and to provide slots which are at least in part inclined or sloping with respect to either an axial or a circumferential line. Thus, a screen plate 50 is illustrated in FIG. 6 in which the slots 52 are mutually inclined to each other and internested in a chevron-like pattern. Such a pattern can be formed simply by moving the screen plate in relation to the laser cutting tool as desired.

FIG. 7 shows a screen plate in which the slots 55 are generally parallel to each other but are inclined to the axis of the screen plate, and the slots in each of the groups or rows may be, if desired, aligned with the slots in the adjacent group or row to provide a spiral-like appearance.

FIG. 8 provides a further example of the versatility of the invention in providing arcuately curved slots 60. Adjacent groups of slots 62 may be provided with a curvature in the opposite direction, if desired. The versatility which is provided not only permits slots to be optimized with respect to density and position, they may also be optimized in relation to the thickness of the plate, taking into account the vector velocity of the stock slurry on either side of the plate. Further the slots may be formed into distinctive patterns which may have a product recognition value.

A particular advantage of the invention resides in the fact that the holes, openings, or slots need not always extend through the shortest distance between the opposite plate surfaces or, in other words, conventionally normal to the plate surfaces. Heretofore, the use of conventional machining techniques has limited screen plates to openings which have centerlines which enter or exit essentially normal to a plate surface. However, particular advantages may be achieved by having one or more openings or slots, the centerlines of which are positioned other than normal to the plate surface or parallel to a radius line and, as noted above, a particular advantage of this invention resides in the fact that the slots may be inclined with respect to the thickness of the plate or to radius lines from the plate center. One such condition is illustrated in connection with the inclined slots 65 in the plate 68 of FIG. 9. Here, the slurry 70 is shown as swirling or rotating within and along the inside surface 20 of the plate with a direction as represented by the arrow 71. The slots 65 are inclined in the plate 68 to intercept the slurry so that the slurry may enter the slots, as indicated by the arrows 72, by making only a minimum change in direction, thereby increasing the extraction efficiency of the plate by decreasing the head across the plate.

The range of angle of inclined openings is illustrated in FIG. 10, in which a partial section of a plate 86 is shown. A forwardly inclined slot is diagrammatically illustrated at 65a, and a rearwardly inclined slot is illustrated at 65b. Slot 65a, similar to slot 65 in FIG. 9, is defined as being forwardly inclined in that it is aligned generally in the vector direction of flow of the slurry or stock 70 as presented by the arrow. Openings or slots which are forwardly inclined have the effect of increasing the extraction efficiency by decreasing the head across the plate, and have the advantage of providing a screen plate with higher efficiency. One or more of the openings or slots may have centerlines which are so inclined from a minimum angle normal to the surface or along a radius 88 to a maximum angle of 180° from the inside surface. The maximum practical range would be approximately 75° from radius line 88 through the inside surface, as illustrated in FIG. 10, to reduce the extent of thickness of the plate to be cut.

There may be instances where one or more of the openings or slots or groups of openings or slots may be inclined rearwardly, that is against or at an acute angle to the direction of flow, as represented diagrammatically by the slot 65b. The reverse oriented openings have the advantage of providing increased downstream cleanliness due to the superior ability of such openings to reject heavier and/or longer fibers and debris. Since the openings slant rearwardly or at an acute angle with respect to the direction of flow, any long or heavier fiber which enters the opening must first make a turn, with respect to the velocity vector, which turn may equal or exceed 90°, thereby making it more difficult for such a long or heavier reject to enter the opening. In appropriate circumstances, a given screen plate may, in accordance with this invention, be provided with openings or slots or combinations of the same, having combinations of inclinations or angles, to achieve a desired result. Also, combinations of slot groupings and patterns are possible.

It should also be understood that while this invention has been described in particular reference to a cylindrical screen for use in pressure screen apparatus for removing contaminant articles for papermakers' stock, the invention is not intended to be limited to such particular apparatus. For example, one or more of the features of the invention, including the weld wear bars, the laser-cut openings or holes, the non-radial or non-normal extending openings, and the inclined or curved slots, may be advantageously applied to other screening apparatus in flat or cylindrical shapes, and in other industries, for example, in the mining industry, where it is desired to reject unwanted material or to provide a separation or selection of materials.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. An improved metal screen plate for use in the pressure screening of papermaking stock, for removing contaminant particles therefrom in pressure screening apparatus, in which said plate has an inlet surface and an outlet surface, and a plurality of laser cut screening openings in said plate extending from said inlet surface to said outlet surface, in closely spaced relation to each other, the improvement comprising:

said openings defined by walls extending generally along straight lines from said inlet surface to said outlet surface, said walls being formed of a thin layer of recast metal material from the laser cutting at the exposed surface thereof presenting a very hard interface to the flow of stock therethrough, said exposed wall surface being free of machine and tool marks.

2. The screen plate of claim 1 in which said openings are in the form of elongated slots having tapered walls which diverge and form a narrow gap at said inlet surface and a wider gap at said outlet surface.

3. The screen plate of claim 1 in which said walls diverge at a total angle of about 2.5°.

4. The screen plate of claim 1 in which said openings are in the form of an individual slots arranged in at least one row in said plate.

5. The screen plate of claim 4 in which adjacent said slots are spaced from each other by land areas therebetween and further comprising means defining wear bars fromed exclusively of weld material on at least some of said land areas.

6. The screen plate of claim 4 in which at least some of said slots are positioned diagonally of said plate with respect to the thickness thereof between said surfaces at an inclination to a radius line from the center of said cylinder to the slot inlet at said inlet surface.

7. The screen plate of claim 6 in which said inclination is greater than zero degree and less than 90°.

8. The plate of claim 4 in which said slots extend axially of the plate.

9. The plate of claim 4 in which at least some of said slots extend diagonally to the axis of said plate.

10. The plate of claim 4 in which at least some of said slots extend along paths which are curved with respect to the axis of said plate.

11. The screen plate of claim 4 in which at least some of said slots are grouped in a wave-like pattern of slots.

12. The screen plate of claim 4 in which at least some of said slots are grouped in a curved pattern of slots.

13. An improved metal screen plate for use in pressure screening apparatus for the screening of papermaker's stock material for removing contaminant particles therefrom, comprising:

said plate having an inlet surface on one side thereof and an outlet surface on an opposite side thereof, and having a plurality of individual laser cut elongated slots extended between said surfaces, said slots having walls formed of a thin layer of very hard recast metal from the laser cutting of said plate.

14. The screen plate of claim 13 in which at least some of said slots are inclined at an angle of other than 90° to the inlet and outlet surfaces.

15. The plate of claim 14 in which said slots in said pattern are curved and are internested with respect to each other.

16. The plate of claim 14 in which said slots are arranged in internested chevrons.

* * * * *